US 6,559,373 B2

(12) United States Patent
Choi et al.

(10) Patent No.: US 6,559,373 B2
(45) Date of Patent: May 6, 2003

(54) METAL CORROSION PREVENTION SYSTEM USING A NON-SACRIFICIAL PHOTOANODE UNDER SUNLIGHT

(75) Inventors: Won Yong Choi, Pohang (KR); Kyoo Young Kim, Pohang (KR); Hyun Woong Park, Jungeup (KR)

(73) Assignee: Envitech, Inc. (KR)

( * ) Notice: Subject to any disclaimer, the term of this patent is extended or adjusted under 35 U.S.C. 154(b) by 0 days.

(21) Appl. No.: 09/974,983

(22) Filed: Oct. 12, 2001

(65) Prior Publication Data
US 2002/0062857 A1 May 30, 2002

(30) Foreign Application Priority Data
Oct. 13, 2000 (KR) ........................ 2000-60397

(51) Int. Cl.$^7$ ........................ H01L 31/042; C23F 13/12
(52) U.S. Cl. ........................ 136/256; 136/252; 136/291; 136/265; 204/196.27; 204/196.01
(58) Field of Search ............... 136/256, 252, 136/291, 265; 204/196.27, 196.01

(56) References Cited
U.S. PATENT DOCUMENTS

| 4,097,655 | A | * | 6/1978 | Witzke | 429/111 |
| 4,136,309 | A | * | 1/1979 | Galberth et al. | 320/102 |
| 4,181,754 | A | * | 1/1980 | McKinzie et al. | 427/74 |
| 4,396,485 | A | * | 8/1983 | Gordon et al. | 204/290.01 |
| 4,524,091 | A | * | 6/1985 | Blaauw et al. | 427/74 |
| 5,366,604 | A | * | 11/1994 | Stilley | 204/196.05 |
| 5,416,314 | A | * | 5/1995 | Lopez-Calleja Lopez | 204/196.27 |
| H1644 | H | | 5/1997 | Muehl, Sr. | 204/196.05 |
| 6,291,763 | B1 | * | 9/2001 | Nakamura | 136/256 |

FOREIGN PATENT DOCUMENTS

| DE | 10011677 A1 | * | 9/2000 |
| JP | 59-177379 A | * | 10/1984 |
| WO | WO-93/01331 A1 | * | 1/1993 |

* cited by examiner

Primary Examiner—Alan Diamond
(74) Attorney, Agent, or Firm—Finnegan, Henderson, Farabow, Garrett & Dunner, L.L.P.

(57) ABSTRACT

The present invention relates to a solar powered cathodic protection system using a photocatalyst which functions as a non-sacrificial photoanode under sunlight, wherein said non-sacrificial photoanode consisting of the photocatalyst such as $TiO_2$ (or ZnO) and an electrolyte, is galvanically connected to a metal structure to be protected and continuously provides electrons to the metal structure, whereby the metal structure is protected from the corrosion. The solar powered cathodic protection system using a non-sacrificial photoanode according to present invention is advantageous in that 1) an external power supply is not necessary, 2) it is easy to maintain the system because the non-sacrificial photoanode according to the present invention can be installed outdoors, and 3) the photocatalyst used as the non-sacrificial photoanode is inexpensive and semipermanent.

5 Claims, 8 Drawing Sheets

METAL CORROSION PREVENTION SYSTEM USING A NON-SACRIFICIAL PHOTOANODE UNDER SUNLIGHT

BACKGROUND OF THE INVENTION

Field of the Invention

The present invention relates to a metal corrosion prevention system using a non-sacrificial photoanode under sunlight, and more particularly to the metal corrosion prevention system using a photo-catalyst non-sacrificial photoanode containing titanium dioxide ($TiO_2$) or zinc oxide (ZnO) and a hole scavenger (or water) to form a galvanic couple with the metal to be protected from the corrosion, thus the non-sacrificial can continuously provide electrons to the metal without consuming itself.

The metal corrosion prevention system of the present invention, which is a different system from conventional corrosion prevention systems, employs sunlight as an energy source, and is capable of being installed outdoors for an easy maintenance and being used semi-permanently. The photocatalyst employed in the non-sacrificial photoanode according to the present invention converts photons into electrons and empty holes. In case that $TiO_2$ is used as a photocatalyst, the converted hole generates a hydroxyl radical ($E_O=2.81$ V (us NHE)) having a high oxidation ability of various organic pollutants, which is widely used in advanced oxidation process (AOP), and the converted electron is used for the reduction of halogenated compounds and dioxin. In order to utilize the converted electrons, recombination between the converted electrons and the converted holes should be inhibited by eliminating the converted holes. For this purpose, generally an organic compound, which is called as a hole scavenger, is contacted with the photocatalyst.

A conventional method for preventing the corrosion of a metal structure is to provide electrons to the metal structure for a cathodic protection. The cathodic protection is the method to restrain the anode reaction which incurs corrosion of the metal structure by artificially controlling electric potential. The cathodic process method to lower the electric potential by supplying electric current to the metal structure is generally used.

A sacrificial anode protection, which is one of the most well-known cathodic protection methods, prevents the corrosion of a metal structure by cathodizing the metal by connecting electrically with another metal having higher ionization probability than the metal to be protected within the electrolyte. This method is called as a sacrificial anode method because the metal having higher ionization probability is corroded (oxidized) and consumed. Aluminum and magnesium have been widely used as a sacrificial anode in the above-mentioned method.

However, the conventional sacrificial cathodic method has a disadvantage in maintaining the system because an anode should be frequently replaced due to the continuous corrosion.

An impressed current method, which is another well-known cathodic protection method, provides the protection of a metal structure from the corrosion by directly supplying electric current into the metal structure to be protected. In case that an external power supply is available in the near site, the impressed current method could be a useful method. Even though this protection method is suitable for a bigger structure than what a sacrificial cathodic method can protect, the installation of an additional power supply is inevitable.

Along with the rapid increase of study regarding solar energy, there are some prior applications, which utilize the solar energy in preventing the corrosion of metal. For example, U.S. Pat. No. H1644 disclosed the impressers method to prevent the corrosion of a metal structure by supplying directly, electricity generated from the solar energy by means of a photovoltaic solar cell (PV cell), which has been widely used in industries. The characteristic of this method is an impressed method which supplies the electricity generated from the photovoltaic solar cell to the metal structure to be protected by connecting general photovoltaic solar cell to the metal structure, and further an ultracapacitor is employed in case of night and overcastting weather. However, because this method has merely employed the conventional photovoltaic solar cell, the cost of initial installation and maintenance are considerable.

A cathodic protection can be divided into a voltaic-based protection and a current-based protection. The voltaic-based protection can be subdivided in accordance with base voltages of which a widely used voltage is −0.85 V (vs. $Cu/CuSO_4$) corresponding to −0.74 V (vs. SCE). The current-based protection can be changed in accordance with surrounding circumstance of iron, and is usually 1 $\mu A/cm^2$ unless the circumstance is strong corrosive solution. However, things to consider in applying these criteria are the above-described criteria are only minimum protection conditions and it is not necessary to comply with all criteria at the same time, i.e. it is alternate minimum criteria. In other words, if one of criteria is satisfied, the system is determined to be in a protection state regardless of the other criteria.

A non-sacrificial photoanode according to the present invention comprises a photocatalyst such as titanium dioxide ($TiO_2$) and zinc oxide (ZnO) which generates electrons and holes in response to light, whereby the electric potential of the photocatalyst will be moved to negative potential. When the photocatalyst is galvanically coupled with a metal, electrons move to the metal from the photocatalyst, and equilibrium electrode potential is achieved by the polarization of potential of the metal and the photocatalyst.

Because the anode according to a conventional art continuously provides electrons to the metal to be protected with consuming (corroding) itself, it is necessary to periodically replace the sacrificial anode with new one.

In order to overcome the above demerit, the present invention is provided with a photocatalyst used as a non-sacrificial photoanode, which can continuously provide the electrons in galvanic circuit without corrosion of the photocatalyst itself by converting photons into electrons in response to sunlight.

The photocatalyst has the attribute of a semiconductor as same as silicon. Moreover, the photocatalyst is more stable and inexpensive as well as it is not required sophisticated technique to manufacture unlike silicon.

Even though, since 1972, the study concerning the photocatalyst, especially titanium dioxide ($TiO_2$), has been developed in the various fields such as the purification of a contamination, the decomposition of water, the photo-electrochemical solar cell containing dye sensitizer, and a super-hydrophilicity, the study or possibility to prevent the corrosion of a metal by means of a photocatalyst has not been reported yet.

SUMMARY OF THE INVENTION

Consequently, an object of the present invention is to suggest a new possibility and application of the photocatalyst as a non-sacrificial photoanode to prevent corrosion of a metal, and to develop an optimized non-sacrificial photoanode considering several variables including the density of sunlight.

DETAILED DESCRIPTION OF THE INVENTION

Hereinafter, the present invention will be described in detail referring to accompanying drawings.

Figure 1:
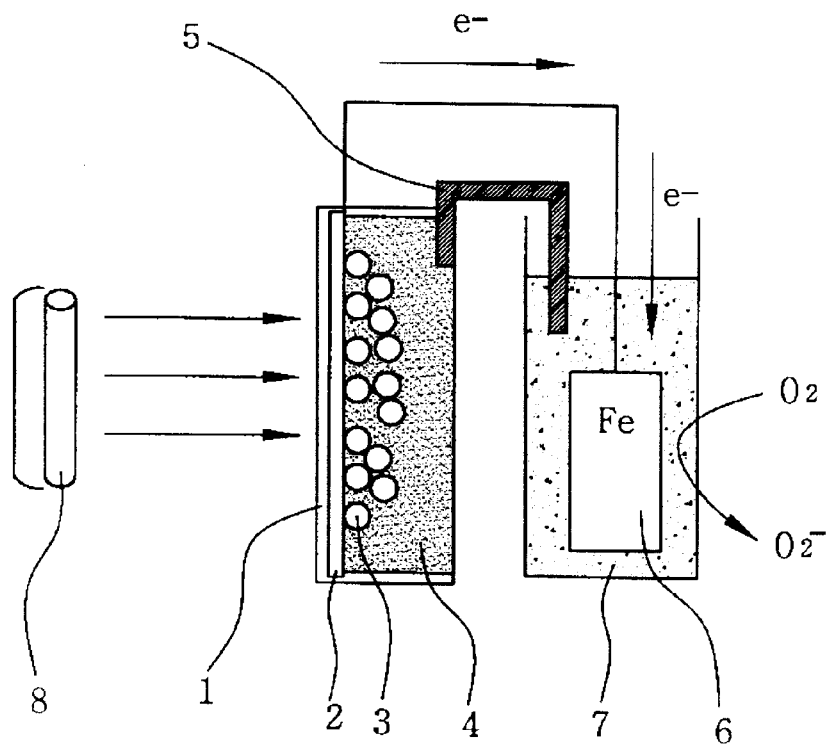
FIG. 1 is a schematic view showing the basic theory of a metal corrosion preventing system using a non-sacrificial photoanode according to the present invention.

The present invention provides a photocatalyst such as, for example, titanium dioxide ($TiO_2$) or zinc oxide (ZnO), as a photoelectrode for a non-sacrificial anode. The embodiment of the present invention is achieved by the following procedures. First, a solution is prepared by mixing about 5% by weight of either titanium dioxide ($TiO_2$, Degussa P25) or zinc oxide (ZnO, Aldrich) with water from which minerals have been removed. The solution is then coated onto a conductive glass 2 and dried in air. After drying, the coated glass is baked at a temperature of 450° C. for 30 minutes. As shown in FIG. 1, the photocatalyst electrode 3 is electrically connected to the iron electrode (6) through a copper wire. A hole scavenger 4 can be selected from the group consisting of methanol, ethanol, isopropylalcohol, formic acid, acetic acid, citric acid and oxalic acid. A mixture consisting of 10 ml of said hole scavenger (1 mole) and 1 g of Agar is heated and poured over the photocatalyst electrode in a transparent plastic Petri dish (1). Then the photocatalyst is connected with the solidified hole scavenger. One end of a tube filled with KCl solidified by Agar is connected to the Petri dish so that the tube can function as a salt bridge 5. The other end of the tube is connected to the electrolyte 7 in which the iron is dipped.

10 W-Blacklight, 200 W-Mercury lamp and sunlight are used as sources of light (8) which are irradiated to the photocatalyst. The iron adapted in the embodiment of the present invention has 1.66 $cm^2$ of a surface area and a circle shape. Additionally, an epoxy resin is coated onto the one of the surface of the iron so as to accurately measure corrosion of the metal.

Consequently, the photocatalyst and the iron is galvanically coupled and salt bridge is connected to the electrolyte in which the iron is dipped.

After the irradiation of light, the current and voltage generated between the photocatalyst and the iron is monitored by Potentiostat (Model No. 263 A available from EG&N) and the oxidized substance generated on the surface of the iron is observed by Raman spectrometer (available from Renishaw).

Figure 2:
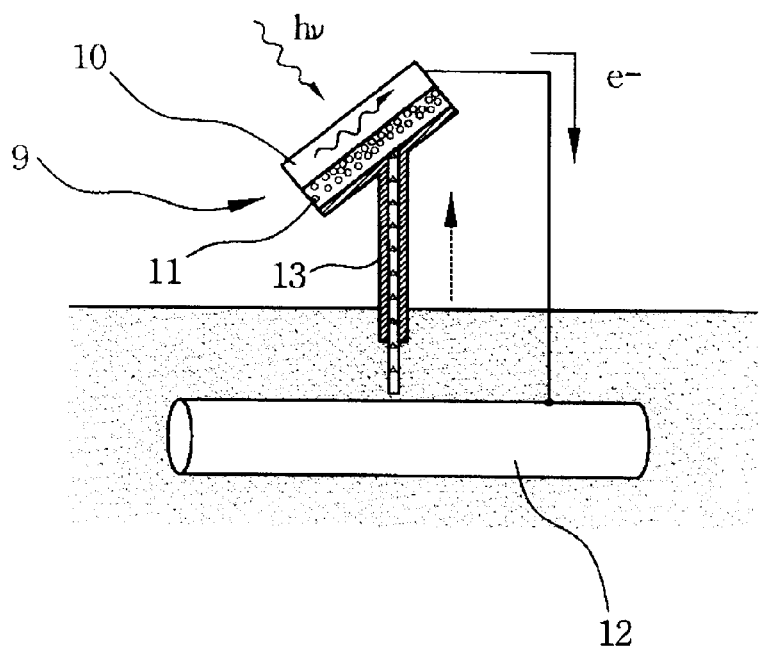
FIG. 2 is an embodiment of a metal corrosion preventing system using a non-sacrificial photoanode according to the present invention.

FIG. 2 schematically shows the embodiment of a solar powered cathodic protection system using a non-sacrificial photoanode according to the present invention. A non-sacrificial anode 9 is installed at the predetermined height for optimized solar exposure. Said non-sacrificial photoanode 9 comprises the photocatalyst plate 10 which can generate electrons in response to sunlight, and the hole scavenger plate 11 which can remove the empty holes generated by said photocatalyst.

Said non-sacrificial photoanode 9 and the metal 12 to be protected are galvanically coupled so that the electrons generated by the photocatalyst are continuously supplied to the metal 12 to be protected. Numeral 13 indicates the support structure supporting the non-sacrificial photoanode 9.

According to said embodiment, in response to light the non-sacrificial photoanode converts the photons into the electrons which are continuously provided to the metal to be protected whereby the metal is in the cathodic protection without consumption of the non-sacrificial photoanode.

EXAMPLES 1

As shown in FIG. 1, a non-sacrificial anode comprising titanium dioxide ($TiO_2$) and an iron were galvanically connected. Then 30 W-Blacklight (300<λ<400 nm, 130 $\mu W/cm^2$) was irradiated to the photocatalyst ($TiO_2$). At this time, $TiO_2$ and the iron were dipped in 0.1 M formic acid and 0.05 M $K_2CO_3$, respectively.

Figure 3:
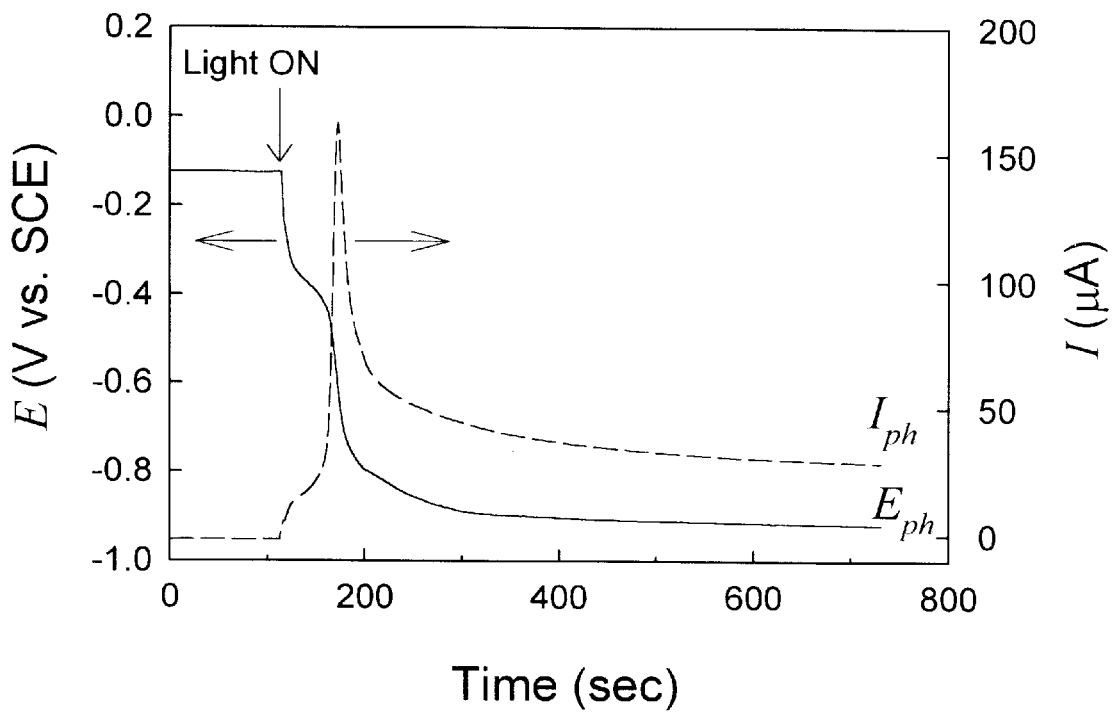
FIG. 3 is a graph showing the movement of coupled potential and photoelectric current in Example 1 according to the present invention.

As shown in FIG. 3, a coupled potential was immediately plunged into −0.9 V (vs. SEC) and photoelectric current of 20~30 $\mu A$ flowed through the circuit upon irradiation with light. The positive photoelectric current means that electrons were moving from titanium oxide ($TiO_2$) to the iron. Namely, the FIG. 3 shows the iron is in the state of cathodic protection under the light because the coupled potential is lower than −0.74 V (vs. SCE), the criteria of protection and photoelectric current is maintained in 20~30 $\mu A$.

TABLE 1

| Hole scavenger | Eph V (vs. SCE) | Iph (μA) |
|---|---|---|
| Water | −0.47 | 8.4 |
| methanol | −0.62 | 19.2 |
| Ethanol | −0.59 | 17.9 |
| 2-propanol | −0.59 | 17.2 |
| Formate | −0.84 | 21.1 |
| acetic acid | −0.48 | 13.1 |
| citric acid | −0.55 | 16.4 |
| oxalic acid | −0.49 | 14.4 |

Table 1 represents the values of photoelectric current and coupled photopotential in accordance with various hole scavengers in Example 1.

The above Table 1 represents the values of photoelectric current and coupled photopotential which were produced in the galvanic circuit consisting of titanium dioxide ($TiO_2$) and the iron dipped in 0.05M $K_2CO_3$ in response to 30 W-blacklight in accordance with the change of the hole scavengers. As shown, all hole scavengers change the value of coupled photopotential into negative (−) value and photoelectric current into positive (+) value. Of all the hole scavengers, because the formic acid has the lowest negative (−) value, the formic acid was employed as the hole scavenger to contact the photocatalyst in the following examples and experiments.

Figure 4:
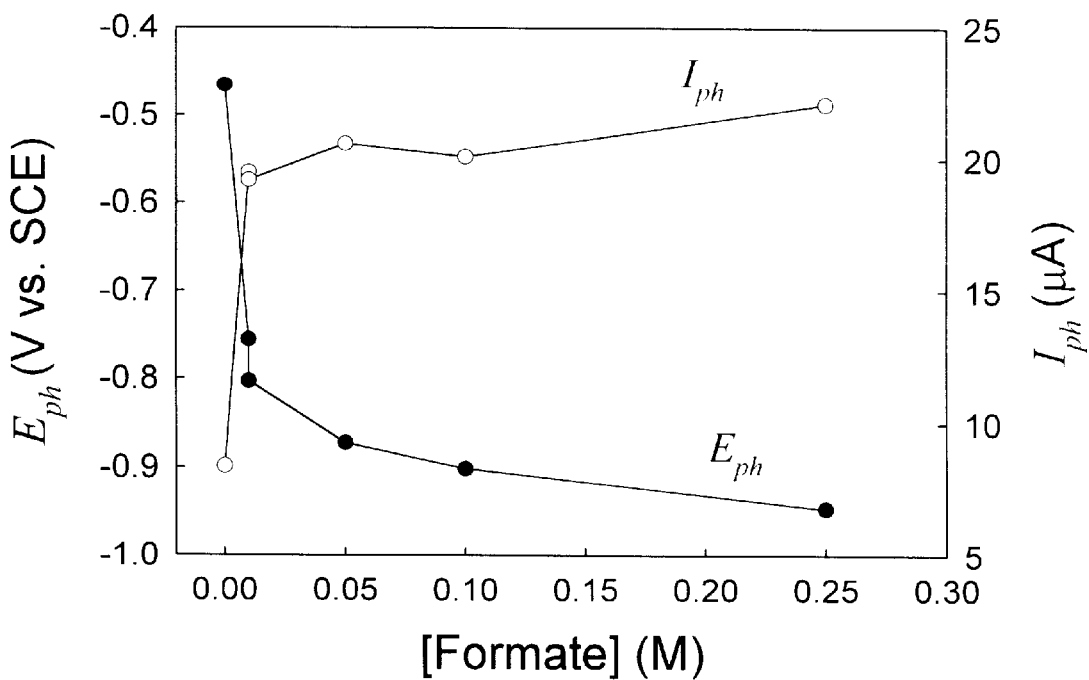
FIG. 4 is a graph showing the movement of coupled photopotential and photoelectric current according to the concentration of a hole scavenger in Example 1.

FIG. 4 shows the movement of coupled photopotential and photoelectric current, which were changed in accordance with the concentration of a formic acid in the galvanic circuit consisting of titanium dioxide ($TiO_2$) dipped in formic acid and the iron dipped in 0.05M $K_2CO_3$ under the 30 w-blacklight. As shown in FIG. 4, as the concentration of the formic acid was higher, the coupled photopotential became lower and the photoelectric current became higher However, the concentration of formic acid does not influence to the value of photoelectric current and coupled photopotential anymore, if the concentration of formic acid become higher than 0.1M. Thus the concentration of the formic acid used for a hole scavenger was fixed to 0.1M in following examples and experiments.

Figure 5:
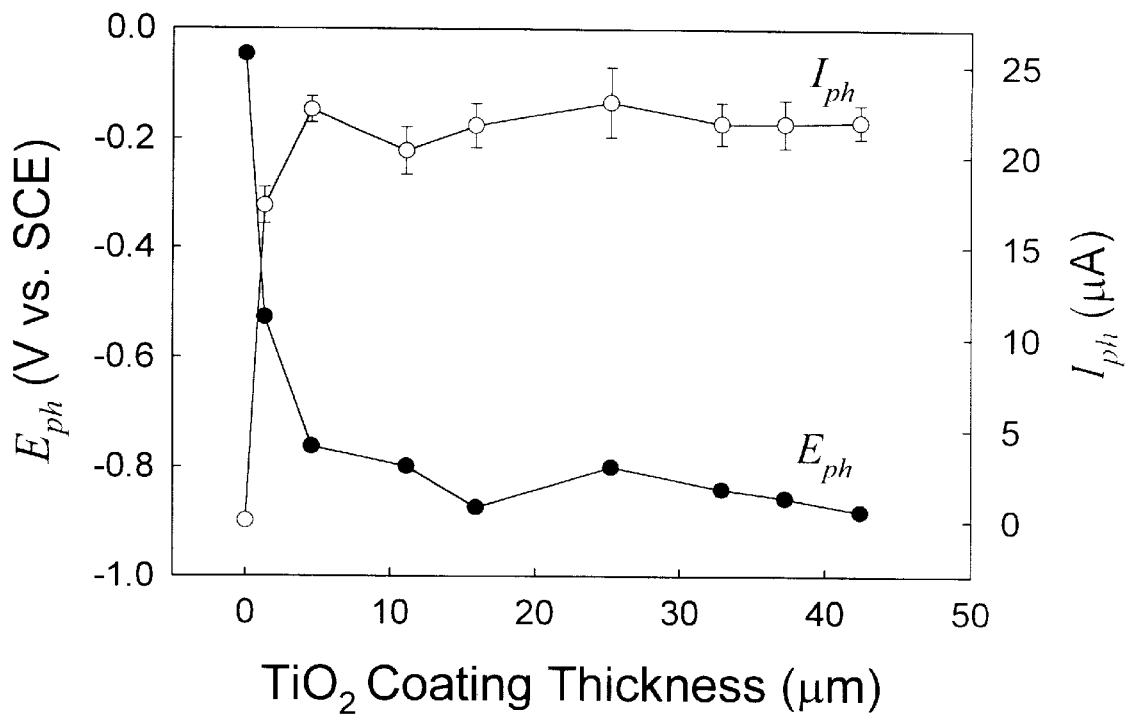
FIG. 5 is a graph showing the movement of coupled photopotential and photoelectric current according to the thickness of a photocatalyst ($TiO_2$) in Example 1.

FIG. 5 shows the movement of coupled photopotential and photoelectric current, which were changed in accordance with the thickness of titanium dioxide ($TiO_2$) coating layer in the galvanic circuit consisting of titanium dioxide ($TiO_2$) dipped in 0.1M formic acid and the iron dipped in 0.05M $K_2CO_3$ while 30 W-blacklight is irradiated to titanium oxide ($TiO_2$). The thickness of titanium dioxide ($TiO_2$) coating layer has a influence to the coupled photopotential and photoelectric current, and should be considered as critical factor in manufacturing the non-sacrificial photoanode at economical aspect. As shown in FIG. 5, if the thickness of titanium dioxide ($TiO_2$) coating layer was thicker than about 10 μm, the photoelectric current and coupled photopotential were nearly not affected by the thickness of titanium dioxide ($TiO_2$) coating layer. Accordingly, the thickness of titanium dioxide ($TiO_2$) coating layer was maintained at 10 μm in following examples and experiments.

Figure 6:
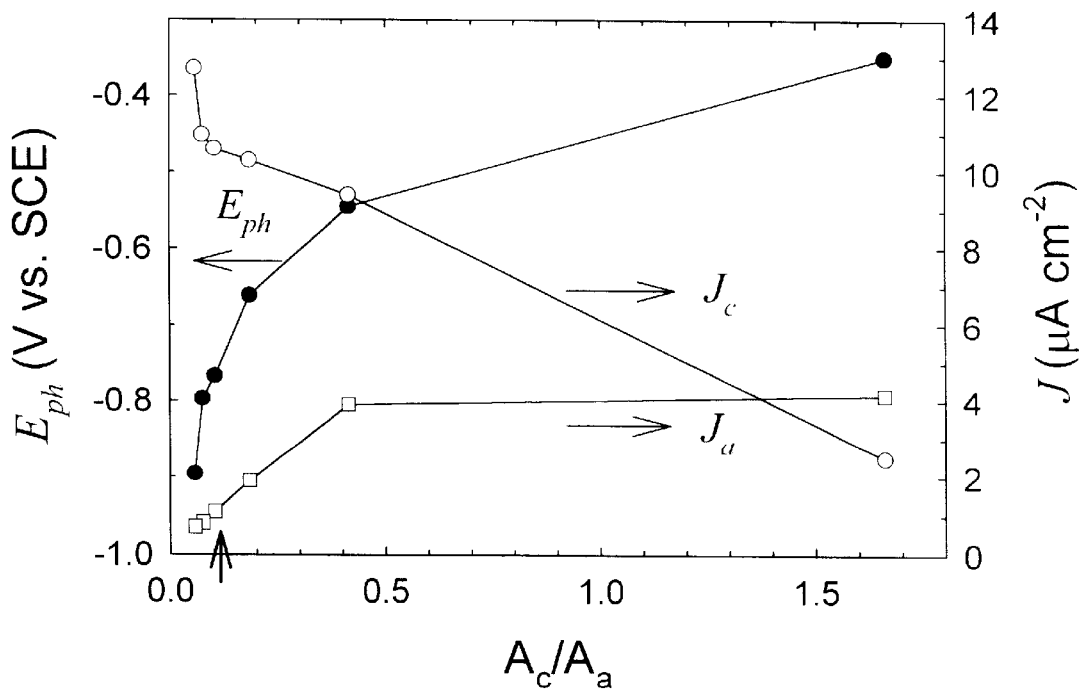
FIG. 6 is a graph showing the movement of coupled photopotential and photoelectric current according to the area ratio of a photocatalyst to iron in Example 1.
Figure 7:
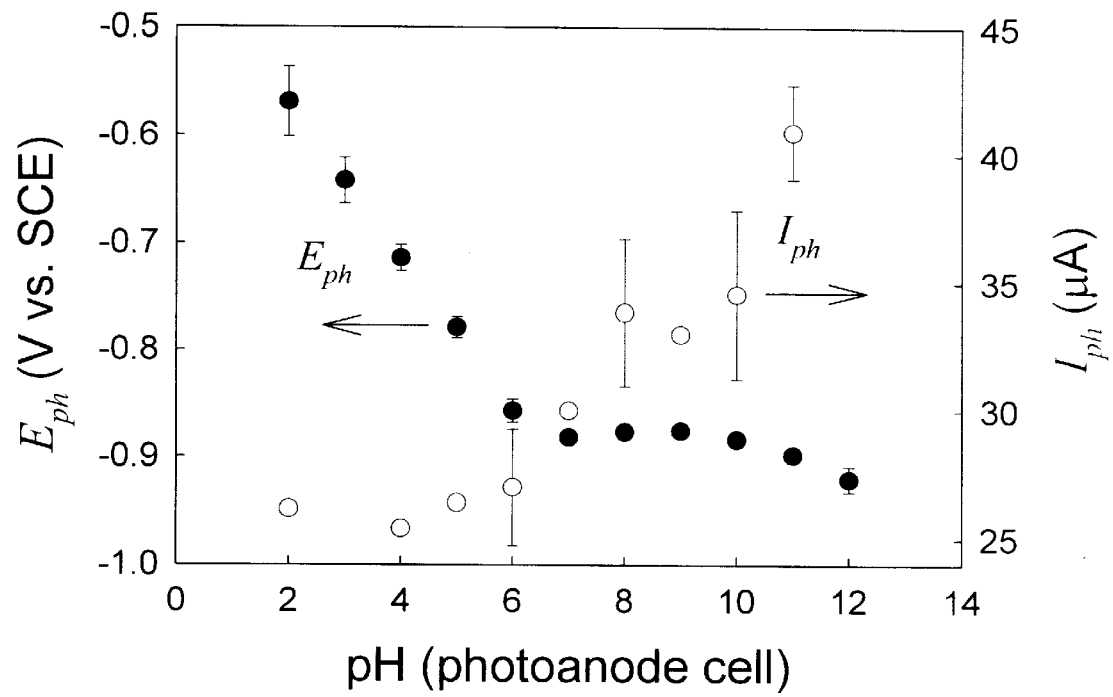
FIG. 7 is a graph showing the movement of coupled photopotential and photoelectric current according to the pH of a photoanode cell in Example 1.

In a cathodic protection, the area ratio of a non-sacrificial photoanode to a metal to be protected is a very important factor to determine the efficiency of protection and the cost of manufacturing the non-sacrificial photoanode. In order to find out the influence of the area of the non-sacrificial photoanode, the experiment was conducted under the same condition as above-described experiments. The result of experiment is disclosed in FIG. 6 (Ac indicates the area of the iron, $A_a$ indicates the area of titanium oxide ($TiO_2$)). As shown in FIG. 6, if the area of the $TiO_2$ becomes relatively larger than that of the iron, (namely, the value of $A_c/A_a$ becomes small) the value of coupled photopotential moved toward negative (−) value and photoelectric current density (Jc) was increased. (The arrow in the FIG. 6 indicates our experiment condition.) Additionally, the pH of a hole scavenger was also critical factor of the optimization of the non-sacrificial anode because the reduction potential of titanium dioxide ($TiO_2$) and photoelectric current varied in accordance with the pH of the hole scavenger. FIG. 7 showed that the value of coupled photopotential moved toward negative (−) value and the value of photoelectric current moved toward positive (+) when the pH of formic acid was increased.

EXAMPLES 2

Figure 8:
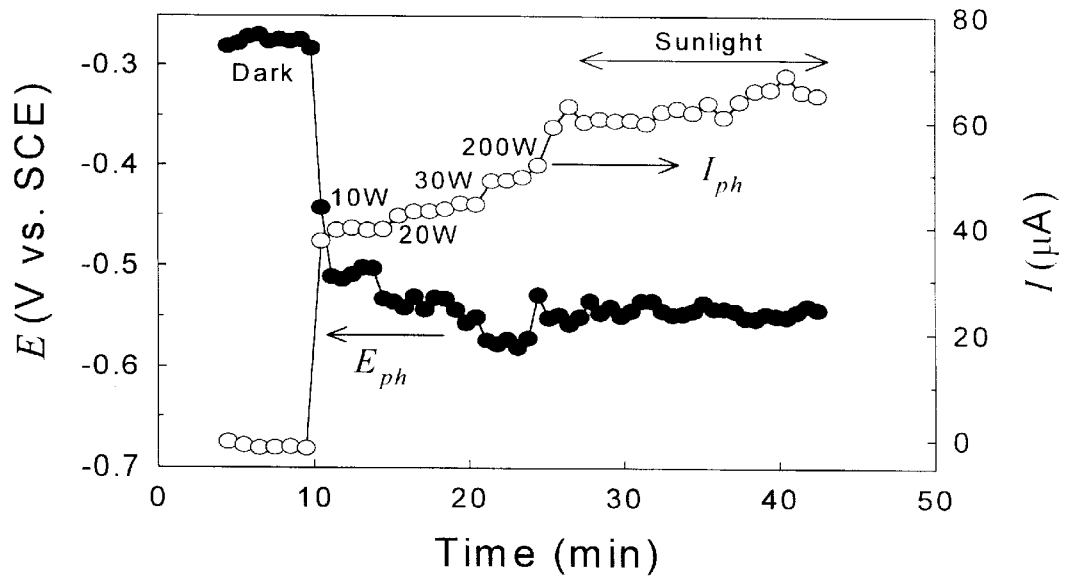
FIG. 8 is a graph showing the movement of coupled potential and photoelectric current according to the intensity of light in Example 2.

In this example, the movements of coupled potential and photoelectric current, which were produced in galvanic circuit consisting of titanium dioxide ($TiO_2$) and the iron dipped in water of pH 4, were observed when 10W, 20W, 30W, 200W artificial light and sunlight were irradiated. The corresponding ultraviolet intensity of the above lights are 58 $\mu W/cm^2$, 100 $\mu W/cm^2$, 130 $\mu W/Cm^2$, 1.53 $\mu W/cm^2$ and 1.55 $\mu W/cm^2$, respectively. FIG. 8 properly depicts that electrons immediately move from titanium dioxide ($TiO_2$) anode to the iron cathode and at the same time value of coupled potential moves toward (−) value upon irradiation with lights. Furthermore, it is predictable that this system can be adaptable under sunlight because it was proved that the cathodic protection was successfully kept under the artificial light of 30W lamp whose intensity is much weaker than that of sunlight.

EXAMPLES 3

In this example, titanium dioxide ($TiO_2$) anode optimized in Example 1 was galvanically connected to the iron dipped in 10 g/L of salt water, and 30W-blacklight was continuously and periodically irradiated to said $TiO_2$ anode.

Figure 9:
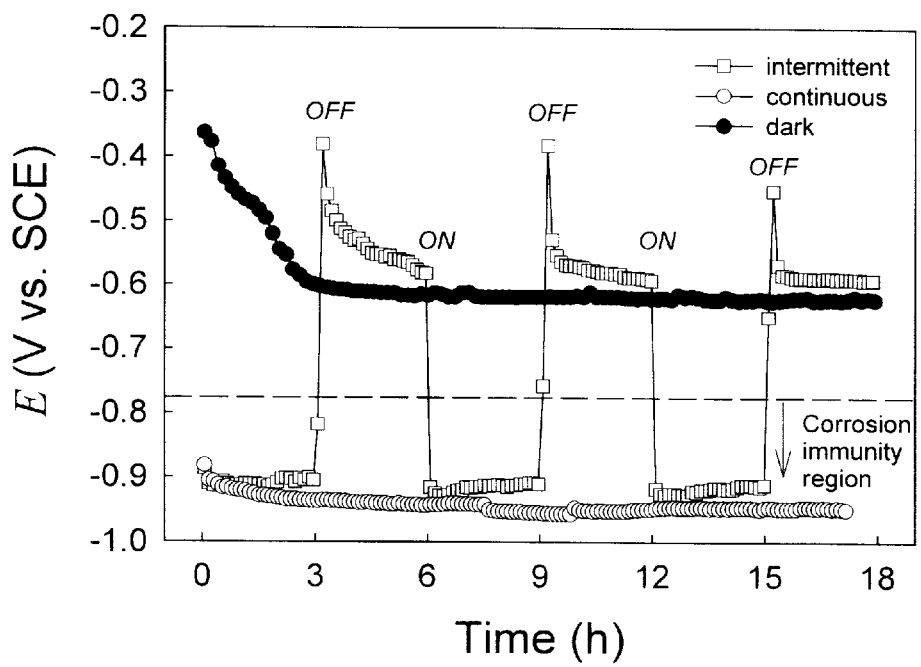
FIG. 9 is a graph showing the movement of coupled photopotential in Example 3.

As shown in FIG. 9, the irradiation of light caused the immediate drop of coupled potential to −0.9 V and the discontinuation of irradiation resulted in restoration of potential. After the repetition of irradiation-discontinuation experiment that the irradiation of the light is periodically continued and discontinued for each 3 hours or 9 hours, it was noticed that $TiO_2$ used as a non-sacrificial photoanode was always activated whenever light was irradiated.

Figure 10:
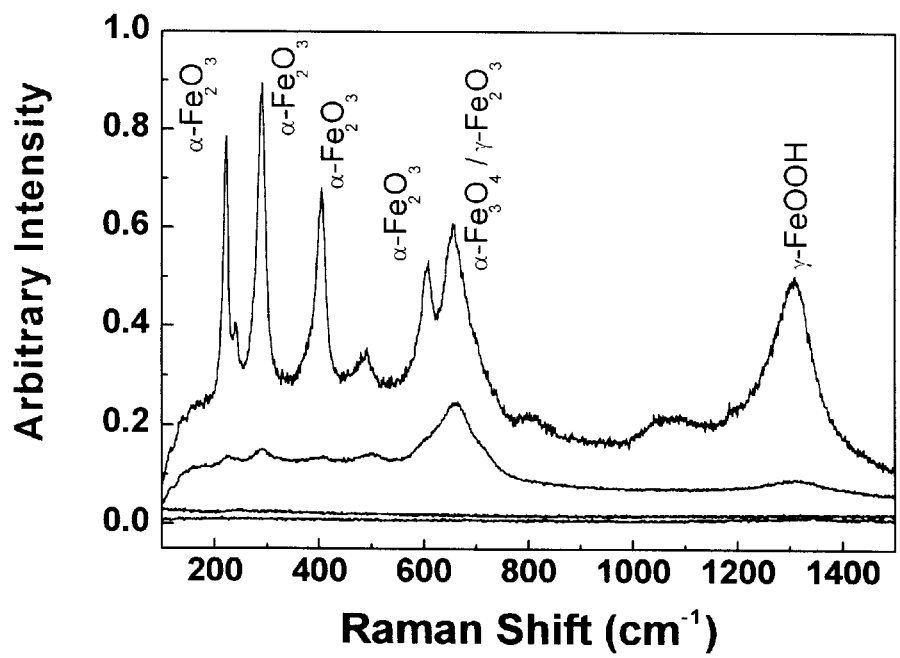
FIG. 10 is a graph showing the generating pattern of the oxide layer in Example 3.

Because the oxidized layer of the iron is generated by corrosion of the iron, it is possible to predict the advance of corrosion by monitoring the oxidized layer. FIG. 10 shows the oxidized layer observed on the surface of the iron according to the experiment of FIG. 9. In the FIG. 9, each peak of graph indicates the oxidized substance of iron and it was noticed that the continuation of irradiating light perfectly prevented the occurrence of the oxidized layer. On the other hand, a considerable amount of oxidized layer was generated when the light was not irradiated at all. Additionally, it was noticed that the periodical irradiation also caused mid-class oxidation

EXAMPLES 4

A electrolyte in which the iron is dipped is an important variable because the speed of corrosion rather depends on the electrolyte.

Figure 11:
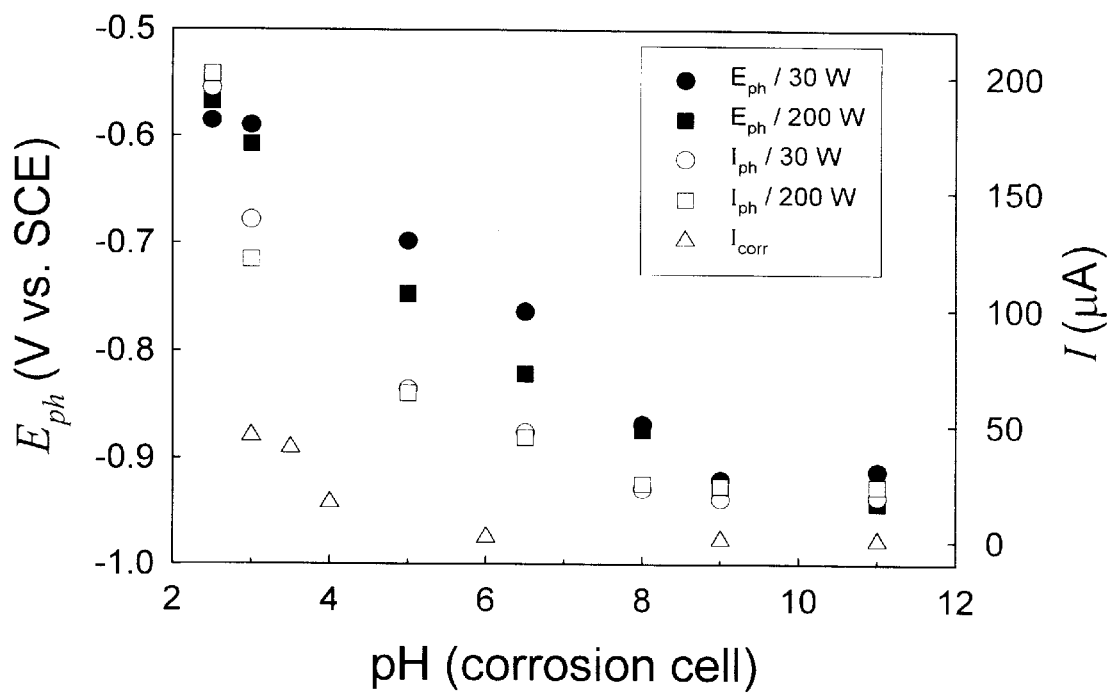
FIG. 11 is a graph showing the effect of pH on coupled photopotential and photoelectric current in Example 4.
Figure 12:
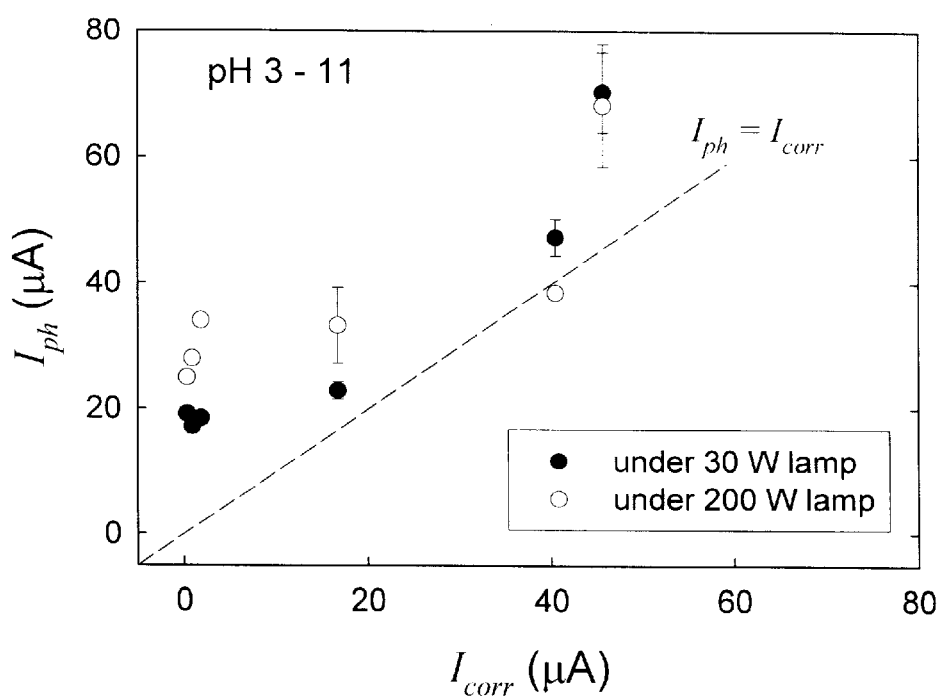
FIG. 12 is a graph showing a comparison of corrosion current with photoelectric current in Example 4.

The FIG. 11 represents the movement of coupled photopotential and photoelectric current at the non-sacrificial photoanode in accordance with the variation of pH of the electrolyte in which the iron is dipped. The change of electrolyte into strong corrosive electrolyte due to the decrease of pH causes coupled photopotential and photoelectric current to move toward (−) value. As a result of experiment which changed the intensity of the light, it was noticed that the intensity of light did not affect that much.

EXAMPLES 5

In this example, titanium dioxide ($TiO_2$) of the non-sacrificial photoanode optimized in Example 4 was galvanically connected to the iron dipped in 10 mM $K_2CO_3$ of pH 6.2 and sunlight was irradiated. This experiment was conducted for two days from Jun. 15, 2000 to Jun. 16, 2000 through three different conditions including the irradiation for 7 hours (from 11:00 to 18:00 on Jun. 15, 2001), discontinuation of the irradiation for 14 hours (from 18:00 on Jun. 15, 2000 to 8:00 on Jun. 16, 2001) and another irradiation for 9 hours (from 8:00 to 17:00 on Jun. 16, 2001). Totally, sunlight was irradiated to the photocatalyst ($TiO_2$) for 16 hours and discontinued for 14 hours.

The first day (Jun. 15, 2001) of the experiment was mostly cloudy sky through the whole day and rained for 30 minutes. However, it was only bad weather during the experiment. As a result of the experiment, it was noticed that coupled photopotential lower than −0.84 V (vs. SCE) and the intensity (300<$\lambda$<400 nm) of the light was fluctuated from 0.75~2.0 mW/cm$^2$ due to the weather of the first day.

Figure 13:
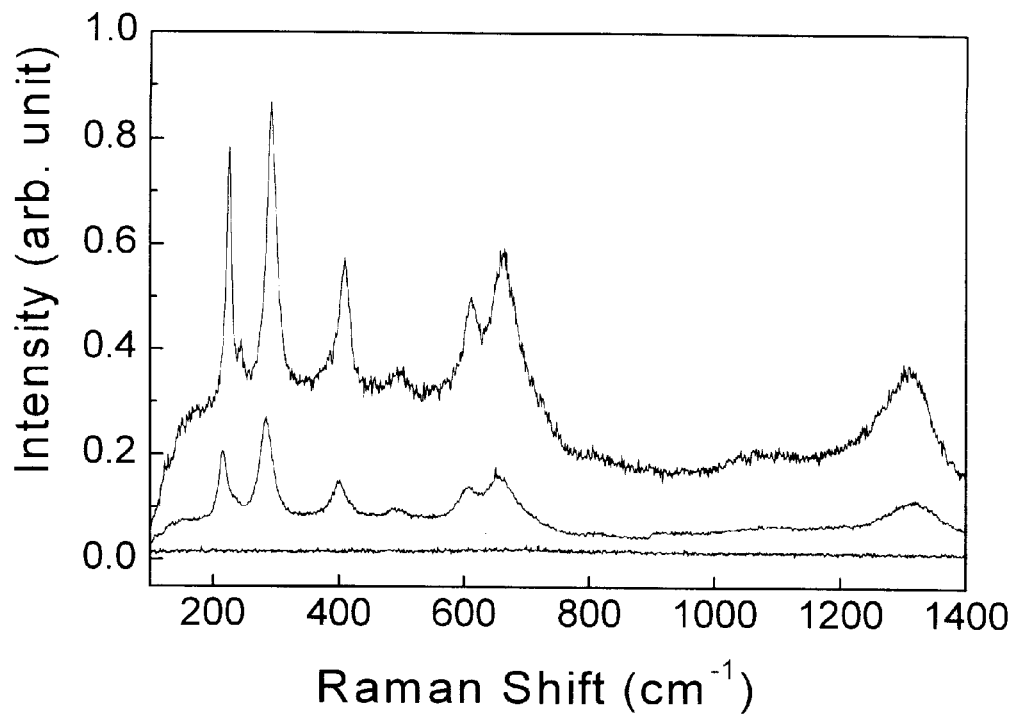
FIG. 13 is a graph showing the pattern of the oxide layer generated under sunlight in Example 5.

FIG. 13 shows the oxidized substances observed on the surface of the iron according to the above experiment. It can be easily noticed that the amount of oxidized substances is decreased when titanium dioxide ($TiO_2$) anode is connected. Even though the amount of the oxidized substances was different in accordance with a condition, the pattern of the oxidized substances was substantially consistent with FIG. 10. On the other hand, when the 30 w-blacklight was irradiated for the same time under the same condition, the oxidized substances were not observed on the surface of the iron.

EXAMPLES 6

Figure 14:
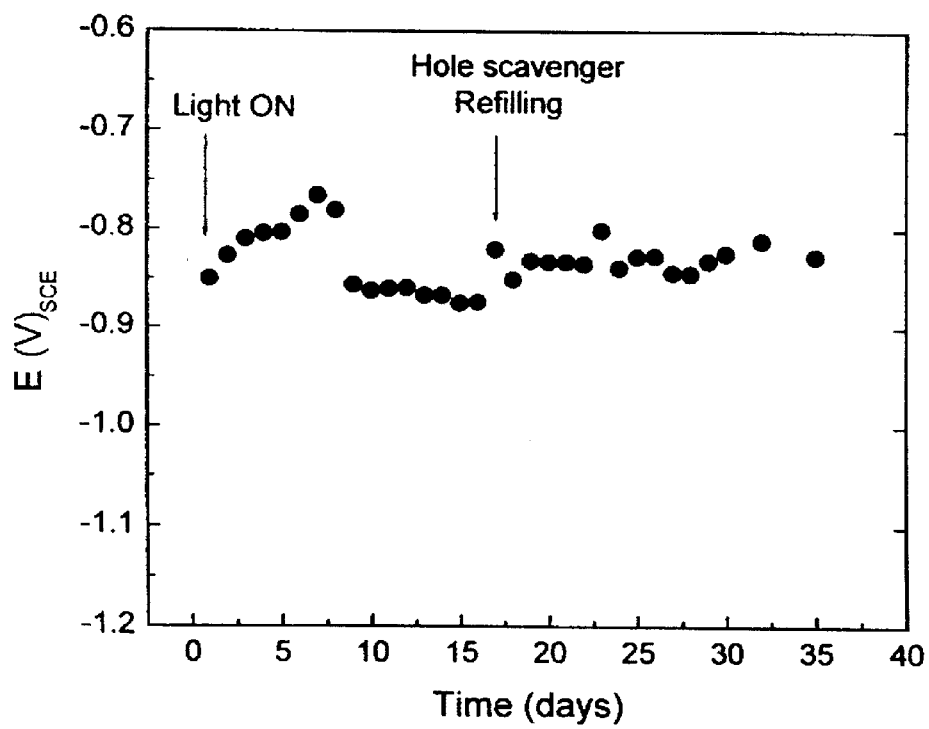
FIG. 14 is a graph showing the endurance of a hole scavenger and the continuation of coupled photopotential in Example 6.

In this example, titanium dioxide ($TiO_2$) of the non-sacrificial anode optimized in Example 1 was galvanically connected to the iron dipped in water of pH 6 and the 30 W light was irradiated for more than one month. As shown in FIG. 14, the coupled photopotential was constantly maintained at −0.8V (vs. SCE) as long as light was irradiated.

EXAMPLES 7

Figure 15:
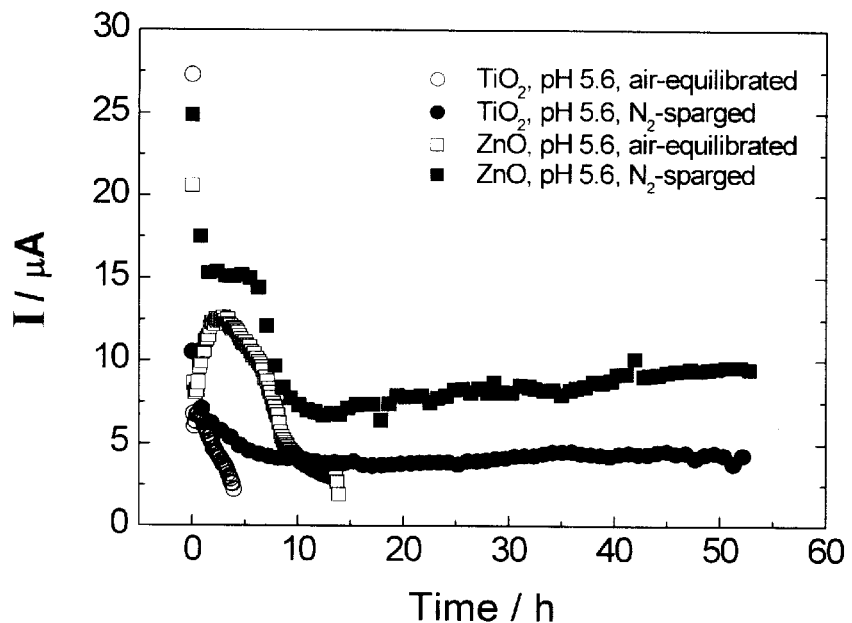
FIG. 15 is a graph showing the variation of photoelectric current produced in the galvanic circuit which employs the water (pH 5.6) as a hole scavenger in Example 7.
Figure 16:
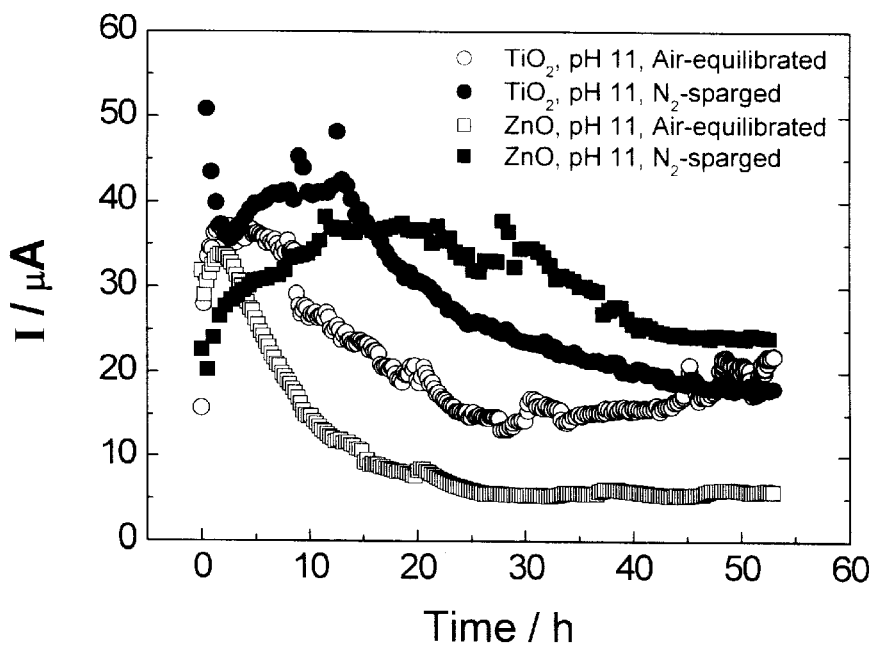
FIG. 16 is a graph showing the variation of photoelectric current produced in the galvanic circuit which employs the water (pH 11) as a hole scavenger in Example 7.

In order to confirm the possibility that titanium dioxide ($TiO_2$) can properly function as a non-sacrificial anode without a hole scavenger such as a formic acid, titanium dioxide ($TiO_2$) anode dipped in water instead of a formic acid was galvanically connected to the iron, and light was irradiated. As shown in FIG. 15, in case of ordinary water (pH 5.6), the iron begun to corrode after 4 hours from the start of the experiment, and in case the nitrogen was added to the water, titanium dioxide ($TiO_2$) produced the photoelectric current enough to cathodically protect the iron. Furthermore, the FIG. 16 shows that the increase of pH of water can contribute to produce the current for cathodic protection.

In order to confirm the possibility that other photocatalysts can be used as a non-sacrificial anode, instead of titanium dioxide ($TiO_2$) anode, zinc oxide (ZnO) anode was galvanically connected to the iron, and light was irradiated. As shown in FIG. 15, in case of ordinary water (pH 5.6), corrosion of the iron occurred. However, in case of the addition of nitrogen or the increase of pH of water, ZnO anode produced the photoelectric current enough to cathodically protect the iron as same as $TiO_2$ anode. As you can see from FIG. 15, corrosion of the iron occurred only under the condition that the pH of water was 5.6 and oxygen existed. In other condition, the iron was successfully protected from corrosion.

TABLE 2

| Condition | Eph V (vs. SCE) | Iph ($\mu$A) | Steel surface |
|---|---|---|---|
| TiO2-water(pH 5.6)-Air | −0.37 | — | Corroded |
| TiO2-water(pH 5.6)-N2 | −0.45 | 4 | Not corroded |
| TiO2-water(pH 11)-Air | −0.53 | 20 | Not corroded |
| TiO2-water(pH 11)-N2 | −0.46 | 18 | Not corroded |
| ZnO-water(pH 5.6)-Air | −0.46 | — | Corroded |
| ZnO-water(pH 5.6)-N2 | −0.45 | 10 | Not corroded |
| ZnO-water(pH 11)-Air | −0.49 | 5 | Not corroded |
| ZnO-water(pH 11)-N2 | −0.49 | 25 | Not corroded |

Table 2 represents the values of photoelectric current and coupled photopotential produced in galvanic circuits without using a hole scavenger in Example 7.

Referring to the above Table 2 arranging the result of FIG. 15 and FIG. 16, it was noticed that the iron was successfully protected from corrosion even though the coupled photopotential produced in the galvanic circuit in which a hole scavenger was substituted with water, was higher than that produced in the galvanic circuit having a hole scavenger.

As described above, when the sunlight is irradiated to the galvanic circuit comprising titanium dioxide ($TiO_2$) (or zinc oxide (ZnO)) of a photocatalyst as a non-sacrificial photoanode and a metal to be protected as cathode, the electrons generated by the non-sacrificial photoanode move to the cathode, whereby the metal is free from corrosion.

The cathodic protection system according to the present invention is advantageous in that 1) a photocatalyst can function as a non-sacrificial photoanode under a sunlight, 2) an external power supply is not necessary, 3) it is easy to maintain the system because the non-sacrificial photoanode according to the present invention can be installed outdoors unlike that of prior art, and 4) the photocatalyst used as the non-sacrificial photoanode is inexpensive as well as it is not required sophisticated technique to manufacture the same.

What is claimed is:

1. A solar powered cathodic protection system using a non-sacrificial photoanode, comprising:

a non-dye sensitized photocatalyst coated on a conductive material; and a metal structure to be protected electrically connected to the non-dye sensitized photocatalyst through an external wire connected to the conductive material, wherein said non-dye sensitized photocatalyst functions as the non-sacrificial anode by directly generating electrons and continuously providing the electrons to the metal structure when sunlight is irradiated to said non-dye sensitized photocatalyst.

2. The solar powered cathodic protection system according to claim 1, further comprising a hole scavenger to eliminate holes.

3. The solar powered cathodic protection system according to claim 2, is wherein said photocatalyst is chosen from titanium dioxide ($TiO_2$) and zinc oxide (ZnO).

4. The solar powered cathodic protection system according to claim 2, wherein said hole scavenger is chosen from methanol, ethanol, isopropyl alcohol, formic acid, acetic acid, citric acid and oxalic acid.

5. The solar powered cathodic protection system according to claim 2, wherein said hole scavenger comprises pure water.

* * * * *